United States Patent
Zhang et al.

(10) Patent No.: US 10,819,485 B2
(45) Date of Patent: Oct. 27, 2020

(54) PRECODING MATRIX CHANNEL INFORMATION TRANSMISSION APPARATUS AND METHOD, AND SYSTEM

(71) Applicant: Huawei Technologies Co., Ltd., Shenzhen (CN)

(72) Inventors: Di Zhang, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/261,000

(22) Filed: Jan. 29, 2019

(65) Prior Publication Data

US 2019/0158247 A1    May 23, 2019

Related U.S. Application Data

(63) Continuation of application No. PCT/CN2016/092522, filed on Jul. 30, 2016.

(51) Int. Cl.
*H04L 5/00* (2006.01)
*H04B 7/06* (2006.01)
(Continued)

(52) U.S. Cl.
CPC ........... *H04L 5/0048* (2013.01); *H04B 7/024* (2013.01); *H04B 7/0452* (2013.01);
(Continued)

(58) Field of Classification Search
CPC ..... H04L 5/0048; H04L 1/00; H04L 25/0226; H04L 5/0057; H04L 25/03343;
(Continued)

(56) References Cited

U.S. PATENT DOCUMENTS 10,224,993 B2 * 3/2019 Kim .................. H04B 7/10
10,498,407 B2 * 12/2019 Park .................. H04B 7/0639
(Continued)

FOREIGN PATENT DOCUMENTS

CN    102299759 A    12/2011
CN    105009492 A    10/2015
(Continued)

OTHER PUBLICATIONS

ZTE, "Variable Granularity Feedback", TSG-RAN WG1 #59bis, R1-100526, Valencia, Spain, Jan. 18-22, 2010, 6 pages.
(Continued)

*Primary Examiner* — Mounir Moutaouakil
(74) *Attorney, Agent, or Firm* — Slater Matsil, LLP

(57) ABSTRACT

A channel information transmission apparatus and method, and a system are disclosed to improve channel information feedback precision. A first device includes: a receiving module, configured to receive a reference signal from a second device; a processing module, configured to obtain a precoding matrix based on the reference signal, and generate first channel information and second channel information that are used to indicate the precoding matrix; and a sending module, configured to send the first channel information and the second channel information to the second device.

13 Claims, 7 Drawing Sheets

(51) Int. Cl.
*H04L 1/00* (2006.01)
*H04B 7/0456* (2017.01)
*H04B 7/024* (2017.01)
*H04B 7/0452* (2017.01)
*H04H 20/74* (2008.01)
*H04L 25/02* (2006.01)

(52) U.S. Cl.
CPC ......... *H04B 7/0456* (2013.01); *H04B 7/0632* (2013.01); *H04B 7/0639* (2013.01); *H04B 7/0645* (2013.01); *H04B 7/0663* (2013.01); *H04H 20/74* (2013.01); *H04L 1/00* (2013.01); *H04L 5/0057* (2013.01); *H04L 25/0226* (2013.01)

(58) Field of Classification Search
CPC . H04L 25/0204; H04L 25/0224; H04L 5/006; H04L 5/0023; H04L 5/14; H04L 1/0026; H04B 7/0663; H04B 7/0645; H04B 7/0456; H04B 7/024; H04B 7/0452; H04B 7/0632; H04B 7/0639; H04B 7/0634; H04H 20/74
See application file for complete search history.

(56) References Cited

U.S. PATENT DOCUMENTS

| | | |
|---|---|---|
| 2003/0124995 A1 | 7/2003 | Tanaka |
| 2005/0143979 A1* | 6/2005 | Lee .................. G10L 19/24 704/208 |
| 2005/0287978 A1 | 12/2005 | Maltsev et al. |
| 2008/0316935 A1* | 12/2008 | Bala .................. H04B 7/0408 370/252 |
| 2009/0060082 A1 | 3/2009 | Yuda et al. |
| 2012/0177011 A1 | 7/2012 | Xi et al. |
| 2012/0307649 A1 | 12/2012 | Park et al. |
| 2013/0089158 A1 | 4/2013 | Wu et al. |
| 2016/0013849 A1 | 1/2016 | Kakishima et al. |
| 2016/0056873 A1 | 2/2016 | Wang et al. |
| 2016/0323025 A1 | 11/2016 | Liu et al. |

FOREIGN PATENT DOCUMENTS

| | | |
|---|---|---|
| JP | 2008504735 A | 2/2008 |
| JP | 2014507847 A | 3/2014 |
| JP | 2014175810 A | 9/2014 |
| JP | 2014195144 A | 10/2014 |
| JP | 2015015717 A | 1/2015 |
| KR | 20090117583 A | 11/2009 |
| KR | 20110093379 A | 8/2011 |
| WO | 2002015433 A1 | 2/2002 |
| WO | 2006118123 A1 | 11/2006 |
| WO | 2014005257 A1 | 1/2014 |
| WO | 2015103752 A1 | 7/2015 |

OTHER PUBLICATIONS

Yuichi Kakishima, System-Level Evaluation on Enhanced 4-Tx Codebook for LTE-Advanced Downlink Multi-User MIMO, The Institute of Electronics, Information and Communication Engineers (IEICE) Technical Report, Jan. 16, 2014, vol. 113/No. 385, p. 71-76, with an English abstract, 7 pages.

Huawei, HiSilicon, Discussion and evaluation of analog CSI feedback[online], 3GPP TSG-RAN WG1#85, R1-164097, Internet URL:http://www.3gpp.org/ftp/tsg_ran/WG1_RL1/TSGR1_221/Docs/R1-164097.zip>, May 14, 2016, 7pages.

* cited by examiner

PRECODING MATRIX CHANNEL INFORMATION TRANSMISSION APPARATUS AND METHOD, AND SYSTEM

CROSS-REFERENCE TO RELATED APPLICATIONS

This application is a continuation of International Application No. PCT/CN2016/092522, filed on Jul. 30, 2016, the disclosure of which is hereby incorporated by reference in its entirety.

TECHNICAL FIELD

This application relates to the field of wireless communications technologies, and in particular, to a channel information transmission apparatus and method, and a system.

BACKGROUND

At present, in a Long Term Evolution (LTE) frequency division duplex (FDD) system, user equipment (UE) performs channel estimation based on a reference signal sent by a base station, and then determines and feeds back channel state information. The channel state information includes a rank indicator (RI), a precoding matrix indicator (PMI), and a channel quality indicator (CQI).

The PMI is an index of a precoding matrix. The UE feeds back the PMI to the base station. The base station determines the corresponding precoding matrix based on the received PMI, and performs precoding processing based on the determined precoding matrix, to improve downlink communication quality. Precision of the PMI fed back by the UE determines downlink adaptation performance from the base station to the UE.

How to improve feedback precision of precoding-matrix-related channel information, such as the PMI, to improve the downlink adaptation performance is a problem.

SUMMARY

In view of this, a channel information transmission apparatus and method, and a system are provided to improve feedback precision of precoding-matrix-related channel information and improve downlink adaptation performance.

According to a first aspect, a channel information transmission method is provided. In the method, a second device sends a reference signal, and a first device performs channel estimation based on the received reference signal, generates a precoding matrix, generates first channel information and second channel information that are used to indicate the precoding matrix, and sends the first channel information and the second channel information that are generated to the second device. The second device generates the precoding matrix based on the first channel information and the second channel information that are received, and sends data to the first device based on the generated precoding matrix.

Precision of the first channel information is higher than precision of the second channel information. The first channel information includes phase information of each element in the precoding matrix, and the second channel information includes amplitude information of each element in the precoding matrix.

The phase information in the channel information is relatively crucial for restoring a channel matrix and requires high precision, and the amplitude information is not crucial information for restoring the channel matrix and may have relatively low precision. Therefore, precision of the phase information of the precoding matrix is higher than precision of the amplitude information. On the one hand, channel information feedback overheads can be reduced; on the other hand, channel information feedback precision can be ensured.

Alternatively, after generating the precoding matrix, the first device generates only the first channel information that is used to indicate the precoding matrix, but does not generate the second channel information, and sends only the first channel information when sending channel information to the second device. Optionally, the first channel information is channel information that is unquantized or channel information that is quantized. Optionally, the first channel information is generated for each preset subband in a system frequency band. After receiving the first channel information, the second device generates the precoding matrix based on the first channel information, and sends data to the first device based on the generated precoding matrix. When generating the precoding matrix, the second device may generate the precoding matrix by using a preset amplitude value as an amplitude value of each element in the precoding matrix; or may determine an amplitude value based on information such as a rank value or a quantity of transmit antenna ports, and then generate the precoding matrix by using the determined amplitude value as an amplitude value of each element in the precoding matrix. Because the first channel information is available, the first channel information may be fed back with relatively high precision, so that the second device obtains a relatively precise precoding matrix based on the first channel information, and sends data based on the relatively precise precoding matrix, so as to obtain a relatively good link adaptation effect and improve system performance.

There are a plurality of manners of implementing that the precision of the first channel information is higher than the precision of the second channel information. In specific implementation, the following one or more manners may be used. In an embodiment, the first channel information is channel information that is unquantized, and the second channel information is channel information that is quantized. In an embodiment, both the first channel information and the second channel information are channel information that is quantized, and a quantity of quantization bits of the first channel information is greater than a quantity of quantization bits of the second channel information. In an embodiment, the first device generates the first channel information for each preset subband in a system frequency band, and generates the second channel information for entire system bandwidth. In an embodiment, a sending period of the first channel information is less than a sending period of the second channel information.

A relatively highly precise feedback of phase information may be implemented by using a relatively small period, a relatively intensive frequency band, or a relatively large quantity of quantization bits, or skipping quantization, or the like.

In an optional implementation, the first channel information includes K groups of first channel sub-information. K is a positive integer and is a quantity of column vectors included in the precoding matrix, and each column vector is corresponding to one group of first channel sub-information. The first channel sub-information includes basic first channel sub-information, where the basic first channel sub-information is phase information of a reference element in a column vector corresponding to the first channel sub-information, and a phase of the reference element is non-zero.

The first channel sub-information includes L−2 pieces of relative first channel sub-information, where L is a length of the column vector, one piece of relative first channel sub-information is corresponding to one element whose phase is non-zero in the column vector other than the reference element, and is used to indicate a deviation between a phase of the corresponding element and the phase of the reference element. The first channel sub-information includes the basic first channel sub-information is channel information that is unquantized, and the relative first channel sub-information is channel information that is quantized.

In this optional implementation, the second channel information may be channel information that is quantized, and a quantity of quantization bits of each piece of relative first channel sub-information is greater than a quantity of quantization bits of the second channel information.

In this optional implementation, the second channel information may be channel information that is quantized, and a quantity of quantization bits of each piece of relative first channel sub-information is greater than a quantity of quantization bits of the second channel information.

According to a second aspect, a first device is provided. The first device has a function of implementing behavior of the first device in the method provided in the first aspect. The function may be implemented by hardware, or may be implemented by executing corresponding software by hardware. The hardware or software includes one or more modules that correspond to the foregoing function.

In an optional implementation, a structure of the first device includes a processor, a receiver, and a transmitter. The processor is configured to support the first device in implementing a corresponding function in the method provided in the first aspect. The receiver is configured to support the first device in receiving a reference signal, and may be further configured to support the first device in receiving data. The transmitter is configured to support the first device in sending channel information, and may be further configured to support the first device in sending data. The first device may further include a memory. The memory is configured to be coupled with the processor and stores a program instruction and data necessary for the first device.

According to a third aspect, a second device is provided. The second device has a function of implementing behavior of the second device in the method provided in the first aspect. The function may be implemented by hardware, or may be implemented by executing corresponding software by hardware. The hardware or software includes one or more modules that correspond to the foregoing function.

In an optional implementation, a structure of the second device includes a processor, a receiver, and a transmitter. The processor is configured to support the second device in implementing a corresponding function in the method provided in the first aspect. The transmitter is configured to support the second device in sending a reference signal, and may be further configured to support the second device in sending data. The receiver is configured to support the second device in receiving channel information, and may be further configured to support the second device in receiving data. The second device may further include a memory. The memory is configured to be coupled with the processor and stores a program instruction and data necessary for the second device.

According to a fourth aspect, a wireless communications system is provided. The wireless communications system includes the first device and the second device described in the first aspect.

According to a fifth aspect, a computer storage medium is provided, and is configured to store a computer software instruction used by the first device in the first aspect. The computer software instruction includes a program designed to execute the foregoing aspects.

According to a sixth aspect, a computer storage medium is provided, and is configured to store a computer software instruction used by the second device in the first aspect. The computer software instruction includes a program designed to execute the foregoing aspects.

According to a seventh aspect, a channel information transmission method is provided. In the method, a second device sends a reference signal. A first device performs channel estimation based on the received reference signal, and generates a precoding matrix W, where W is an Nt-row R-column matrix, and $$W = \begin{bmatrix} X & 0 \\ 0 & X \end{bmatrix} \times W_2;$$

X is an Nt/2-row M-column matrix, and $X=[b_0, b_1, \ldots, b_{M-1}]$; $b_i$ is a column vector whose dimensionality is Nt/2, and $0 \le i \le M-1$; Nt is a quantity of antenna ports for sending the reference signal by the second device; $W_2$ is a 2M-row R-column matrix, and $$W_2 = \begin{bmatrix} e_{k_0} & e_{k_1} & \cdots & e_{k_{R-1}} \\ \phi_0 e_{k_0} & \phi_1 e_{k_1} & \cdots & \phi_{R-1} e_{k_{R-1}} \end{bmatrix},$$

where $e_{k_m}$ is a unit vector whose dimensionality is M, a value only of a $k_m{}^{th}$ element is 1, values of other elements are all 0, and $0 \le m \le R-1$; $\phi_n$ is a complex number whose modulus is 1, and $0 \le n \le R-1$; M, R, and Nt are all positive integers, and Nt is an even number.

The first device generates third channel information, fourth channel information, and fifth channel information, where the third channel information is used to indicate X, the fourth channel information is used to indicate $e_{k_0}, \ldots, e_{k_m}, \ldots,$ and $e_{k_{R-1}}$, and the fifth channel information is used to indicate $\phi_0, \ldots, \phi_n, \ldots,$ and $\phi_{R-1}$.

Precision of the third channel information is lower than precision of the fifth channel information. The first device sends the third channel information, the fourth channel information, and the fifth channel information to the second device.

The second device generates a precoding matrix based on the third channel information, the fourth channel information, and the fifth channel information that are received, and sends data to the first device based on the generated precoding matrix.

The fifth channel information in the channel information is relatively crucial for restoring a channel matrix and requires high precision, and the third channel information is not crucial information for restoring the channel matrix and may have relatively low precision. Therefore, the precision of the fifth channel information is higher than the precision of the third channel information. On the one hand, channel information feedback overheads can be reduced; on the other hand, channel information feedback precision can be ensured.

There are a plurality of manners of implementing that the precision of the fifth channel information is higher than the precision of the third channel information. In specific implementation, the following one or more manners may be used. In an embodiment, it may be determined whether quantization is performed and a quantity of quantization bits. In an embodiment, it may be determined whether channel information is generated for entire system bandwidth, or separately generated for each preset subband. For example, the first device generates the third channel information for the entire system bandwidth, and generates the fourth channel information and the fifth channel information for each preset subband in the system frequency band. In an embodiment, high feedback precision of the fifth channel information is implemented by controlling a channel information sending period. For example, a sending period of the third channel information is greater than a sending period of the fourth channel information, and the sending period of the third channel information is greater than a sending period of the fifth channel information.

Any one of the following manners may be used to implement, through quantization, that feedback precision of the fifth channel information is higher than feedback precision of the third channel information. In an embodiment, the third channel information is channel information that is quantized, and the fifth channel information is channel information that is unquantized. In an embodiment, both the third channel information and the fifth channel information are channel information that is quantized, and a quantity of quantization bits of each vector indicated by the third channel information is less than a quantity of quantization bits of the fifth channel information. In an embodiment, both the third channel information and the fifth channel information are channel information that is quantized, and a quantity of quantization bits of each vector indicated by the third channel information is less than a quantity of quantization bits of any $\phi_n$ indicated by the fifth channel information. In an embodiment, both the third channel information and the fifth channel information are channel information that is quantized, and a quantity of quantization bits of each element in any vector indicated by the third channel information is less than a quantity of quantization bits of any $\phi_n$ indicated by the fifth channel information.

According to an eighth aspect, a first device is provided. The first device has a function of implementing behavior of the first device in the method provided in the seventh aspect. The function may be implemented by hardware, or may be implemented by executing corresponding software by hardware. The hardware or software includes one or more modules that correspond to the foregoing function.

In an optional implementation, a structure of the first device includes a processor, a receiver, and a transmitter. The processor is configured to support the first device in implementing a corresponding function in the method provided in the first aspect. The receiver is configured to support the first device in receiving a reference signal, and may be further configured to support the first device in receiving data. The transmitter is configured to support the first device in sending channel information, and may be further configured to support the first device in sending data. The first device may further include a memory. The memory is configured to be coupled with the processor and stores a program instruction and data necessary for the first device.

According to a ninth aspect, a second device is provided. The second device has a function of implementing behavior of the second device in the method provided in the seventh aspect. The function may be implemented by hardware, or may be implemented by executing corresponding software by hardware. The hardware or software includes one or more modules that correspond to the foregoing function.

In an optional implementation, a structure of the second device includes a processor, a receiver, and a transmitter. The processor is configured to support the second device in implementing a corresponding function in the method provided in the first aspect. The transmitter is configured to support the second device in sending a reference signal, and may be further configured to support the second device in sending data. The receiver is configured to support the second device in receiving channel information, and may be further configured to support the second device in receiving data. The second device may further include a memory. The memory is configured to be coupled with the processor and stores a program instruction and data necessary for the second device.

According to a tenth aspect, a wireless communications system is provided. The wireless communications system includes the first device and the second device described in the seventh aspect.

According to an eleventh aspect, a computer storage medium is provided, and is configured to store a computer software instruction used by the first device in the seventh aspect. The computer software instruction includes a program designed to execute the foregoing aspects.

According to a twelfth aspect, a computer storage medium is provided, and is configured to store a computer software instruction used by the second device in the seventh aspect. The computer software instruction includes a program designed to execute the foregoing aspects.

DETAILED DESCRIPTION OF ILLUSTRATIVE EMBODIMENTS

Figure 1:
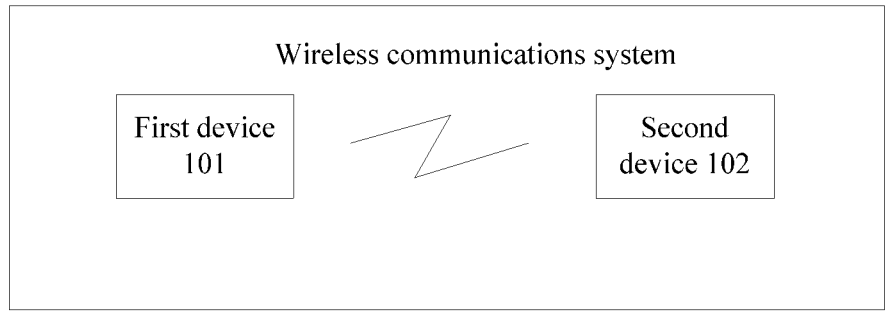
FIG. 1 is a schematic structural diagram of a wireless communications system according to an embodiment of this application.

The following provides detailed descriptions. The detailed descriptions illustrate various implementations of an apparatus and/or a method by using accompany drawings such as block diagrams and flowcharts, and/or examples. These block diagrams, flowcharts, and/or examples include one or more functions and/or operations. Persons skilled in the art may understand that each function and/or operation in the block diagrams, the flowcharts, and/or the examples can be performed independently and/or jointly by using various hardware, software, and firmware, and/or any combination thereof.

To make the embodiments of this application more understandable, the following first explains some descriptions in the embodiments of this application. These explanations shall not be considered as a limitation on the protection scope required by the present invention.

1. Channel Matrix

Assuming that in a wireless communications system, a sending signal is x, a receiving signal is y, a channel impulse response of a channel between x and y is h, and additive Gaussian noise is n, the receiving signal y and the sending signal x satisfy the following relationship:

$$y=hx+n$$

For a multiple input multiple output (Multiple Input Multiple Output, MIMO) system that has Nt transmit antennas and Nr receiving antennas, the receiving signal y and the sending signal x satisfy the following relationship:

$$y=Hx+n, \text{ where}$$

$x \in f^{Nt \times 1}$, $y \in f^{Nr \times 1}$, H is a channel matrix, $H \in f^{Nr \times Nt}$, and $n \in f^{Nr \times 1}$.

An $i^{th}$ row and a $j^{th}$ column of the channel matrix H indicate a complex valued channel gain from a $j^{th}$ transmit antenna to an $i^{th}$ receiving antenna.

When Nt=1 and Nr>1, the MIMO system is a single input multiple output (SIMO) system; or when Nt>1 and Nr=1, the MIMO system is a multiple input single output (MISO) system. Both the SIMO system and the MISO system may be considered as particular cases of the MIMO system. The embodiments of this application are applicable to the MIMO system.

2. Precoding Matrix

A signal transmit end obtains channel information about a channel between the transmit end and a receive end, and then may perform pre-processing on a to-be-sent signal based on the obtained channel information. Some or all interference between data streams may be eliminated in advance at the transmit end, and link adaptation for data sending may be implemented. In other words, different data sending manners may be used depending on different channel conditions, to reduce interference between data streams to the greatest extent.

A matrix used when the transmit end performs precoding processing is a "precoding matrix".

A relationship between a receiving signal y and a sending signal x after the transmit end performs precoding processing may be shown in the following formula:

$$y=HFx+n, \text{ where}$$

F is the precoding matrix.

3. Pre-Processing Method During Downlink Sending in a Current LTE FDD System

A base station sends a measurement reference signal to UE. The UE performs channel estimation based on the received measurement reference signal, to obtain a channel matrix H, and selects a precoding matrix S from a preset codebook set C={Wi}, so as to maximize a capacity or maximize a signal-to-noise ratio (SNR). The UE feeds back an index PMI of the selected precoding matrix to the base station.

For example, a codebook in which a quantity of antenna polls is 2 is shown in the following table. At present, there are only four precoding matrices whose ranks are 1.

| Codebook index (Code Index) | Quantity of layers (Number of layers) | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

It can be learned that the precoding matrix fed back by the UE is quantized. Therefore, an error exists, and consequently, channel information obtained by the base station is inaccurate, and link adaptation performance is poor.

4. Another Channel Information Feedback Method

A base station sends a measurement reference signal to UE. The UE performs channel estimation based on the received measurement reference signal, to obtain a channel matrix H, and the UE directly feeds back, to the base station, channel information that is used to describe H. In this case, an amount of information to be fed back is relatively large, and overheads are large. Consequently, data transmission efficiency is reduced, and system performance is reduced.

In the embodiments of this application, for information, in channel information that is fed back, that is relatively crucial for restoring a channel matrix and that requires high precision, relatively high feedback precision is used, for example, by skipping quantization or performing quantization but with a relatively large quantity of quantization bits; for another example, by performing feedback by using a relatively short period; for another example, by performing feedback for each preset subband in system bandwidth, instead of performing feedback for the entire system bandwidth.

An example is first channel information in the following solution 1, namely, unquantized phase information of each element in a precoding matrix. Another example is fourth channel information (for example, column selection information) and fifth channel information (for example, co-phasing information) in the following solution 2. Such information is fed back with relatively high feedback precision.

Optionally, information, in channel information that is fed back, that is not as crucial for restoring a channel matrix and does not require high precision is fed back with relatively low feedback precision, for example, by using a relatively small quantity of quantization bits during quantization; for another example, by performing feedback by using a relatively long feedback period; for another example, by performing feedback for entire system bandwidth.

An example is second channel information in the following solution 1, namely, amplitude information of each element in the precoding matrix. Another example is third channel information in the following solution 2. Such information is fed back with relatively low feedback precision.

This effectively reduces system overheads and improves system performance while ensuring channel information precision.

The following describes the embodiments of this application in detail with reference to the accompanying drawings.

FIG. 1 is a schematic structural diagram of a wireless communications system according to an embodiment of this application. As shown in FIG. 1, the wireless communications system includes a first device 101 and a second device 102.

The second device 102 sends a reference signal to the first device 101. The first device 101 performs channel estimation based on the reference signal received from the second device 102, and sends, to the second device 102, channel information used to indicate a channel estimation result. The second device 102 sends data to the first device 101 based on the received channel information.

Figure 2:
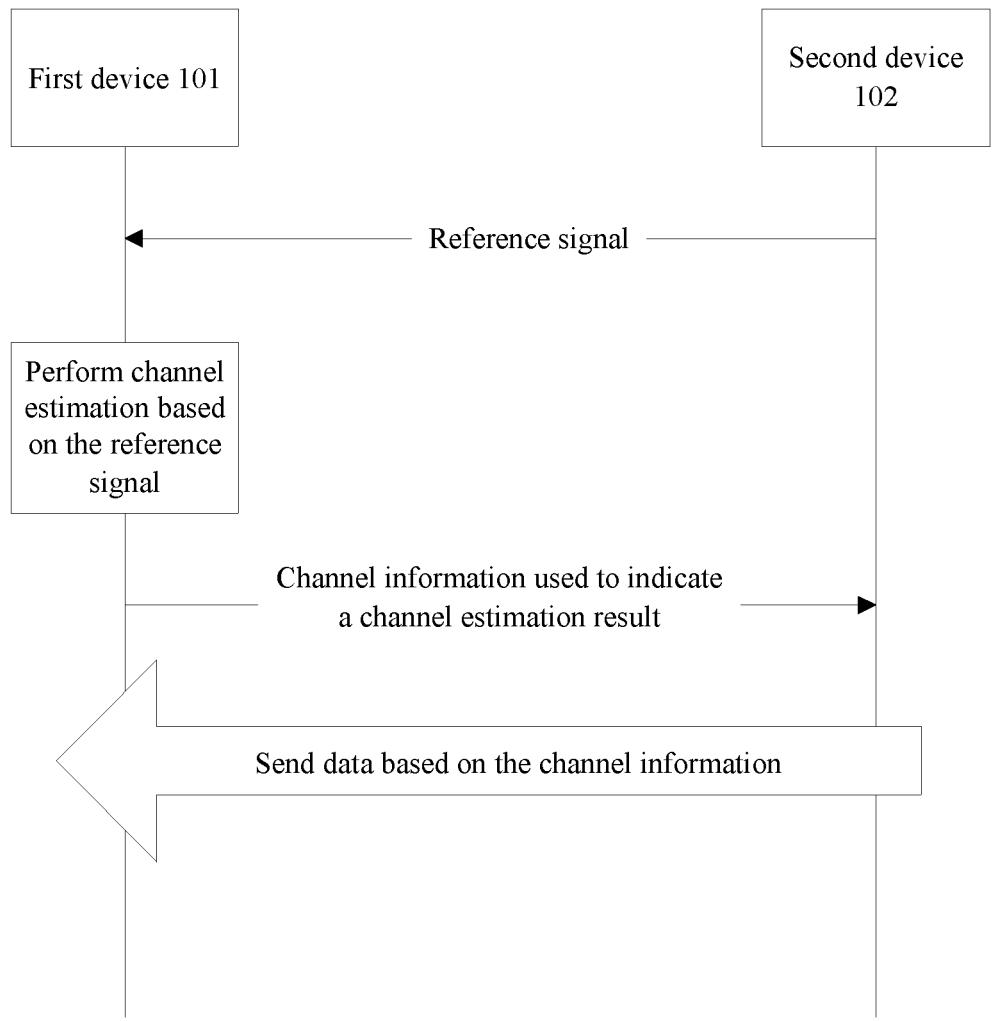
FIG. 2 is a flowchart of channel estimation according to an embodiment of this application.

The foregoing interaction process between the first device 101 and the second device 102 may be shown in FIG. 2.

The first device 101 may be a network device such as a base station, and the second device 102 may be a terminal device. Alternatively, the first device 101 may be a terminal device, and the second device 102 may be a network device. Alternatively, both the first device 101 and the second device 102 are terminal devices. Alternatively, both the first device 101 and the second device 102 are network devices.

Provided that the second device 102 sends the reference signal to the first device 101 and the first device 101 performs channel estimation based on the reference signal and feeds back the channel information, the solution provided in this embodiment of this application may be used to report channel information and send data, to obtain a more precise channel estimation result and improve link adaptation performance.

In addition, regardless of which duplex manner is used for communication between the first device 101 and the second device 102, for example, the foregoing FDD manner or a time division duplex (TDD) manner, the solution provided in this embodiment of this application may be used to obtain a precise channel estimation result and improve link adaptation performance.

Communications standards for communication between the first device 101 and the second device 102 include but are not limited to: Global System for Mobile Communications (GSM), Code Division Multiple Access (CDMA) IS-95, CDMA 2000, Time Division-Synchronous Code Division Multiple Access (TD-SCDMA), Wideband Code Division Multiple Access (WCDMA), Time Division Duplex-Long Term Evolution (TDD LTE), Frequency Division Duplex-Long Term Evolution (FDD LTE), Long Term Evolution-Advanced (LTE-advanced), the personal handyphone system (PHS), Wireless Fidelity (Wi-Fi) stipulated in the 802.11 series protocols, Worldwide Interoperability for Microwave Access (WiMAX), and various future evolved wireless communications systems.

The terminal device may be a wireless terminal. The wireless terminal may be a device that provides a user with voice and/or data connectivity, a handheld device with a wireless connection function, or another processing device connected to a wireless modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a subscriber unit, a subscriber station, a mobile station, a mobile console, a remote station, an access point, a remote terminal, an access terminal, a user terminal, a user agent, a user device, or user equipment.

The network device may include a base station, or a radio resource management device configured to control a base station, or may include a base station and a radio resource management device configured to control the base station. The base station may be a macro cell or a small cell such as a small cell or a pico cell. Alternatively, the base station may be a home base station such as a home NodeB (HNB) or a home evolved NodeB (HeNB). Alternatively, the base station may include a relay node, or the like.

For example, for LTE systems such as a TDD LTE system, an FDD LTE system, or an LTE-A system, the network device may be an evolved NodeB (eNodeB), and the terminal device may be UE. For a TD-SCDMA system or a WCDMA system, the network device may include a NodeB (NodeB) and/or a radio network controller (RNC), and the terminal device may be UE. For a GSM system, the network device may include a base transceiver station (BTS) and/or a base station controller (BSC), and the terminal device may be a mobile station (MS). For a Wi-Fi system, the network device may include an access point (AP) and/or an access controller (Access Controller, AC), and the terminal device may be a station (STA).

Figure 3:
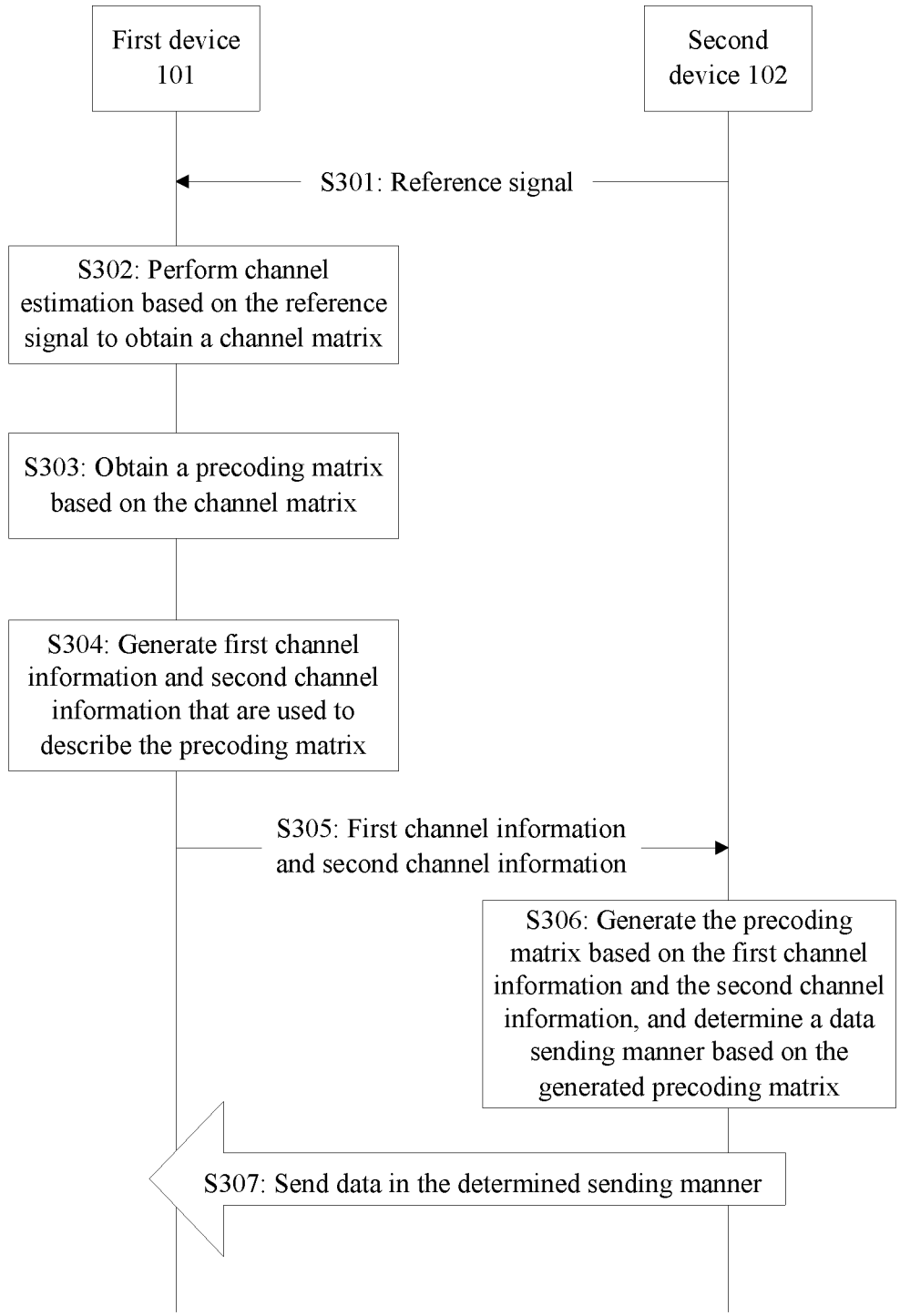
FIG. 3 is a flowchart of a first channel information reporting solution according to an embodiment of this application.
Figure 6:
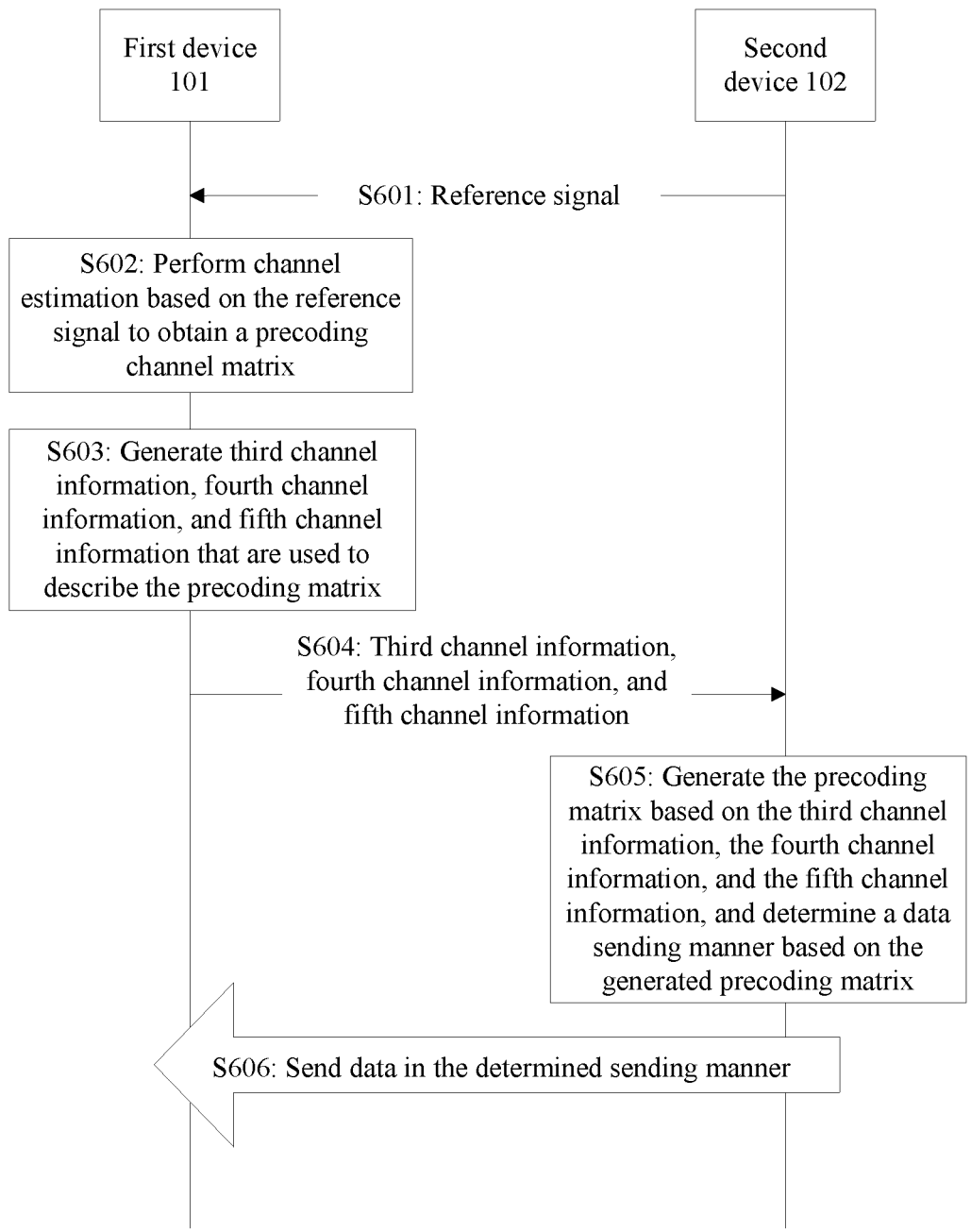
FIG. 6 is a flowchart of a second channel information reporting solution according to an embodiment of this application.

The following FIG. 3 and FIG. 6 show two channel information reporting solutions.

The following separately describes the two solutions shown in FIG. 3 and FIG. 6.

FIG. 3 shows a procedure of a first channel information reporting solution according to an embodiment of this application. As shown in FIG. 3, the procedure includes the following steps.

S301: A second device 102 sends a reference signal to a first device 101, where the reference signal is used to perform channel estimation on a channel from the second device 102 to the first device 101.

Optionally, when the second device 102 is a base station in an LTE system and the first device 101 is user equipment in the LTE system, the reference signal may be a demodulation reference signal (DMRS).

S302: The first device 101 performs channel estimation based on the reference signal, to obtain a channel matrix H.

S303: The first device 101 obtains a precoding matrix based on the channel matrix H.

When the first device 101 obtains the precoding matrix based on the channel matrix H, singular value decomposition (SVD) or another manner may be used.

S304: The first device 101 generates first channel information and second channel information that are used to describe the precoding matrix (marked as a "matrix W").

The first channel information includes phase information of each element in the matrix W.

The second channel information includes amplitude information of each element in the matrix W.

S305: The first device 101 sends the first channel information and the second channel information that are generated to the second device 102.

The first device 101 may send the first channel information and the second channel information to the second device 102 together, or may send the two types of channel information to the second device 102 separately.

For example, if the first channel information and the second channel information are quantized, the first channel information and the second channel information are processed, for example, encoded or modulated, and then sent to the second device 102. If the first channel information and the second channel information are unquantized, the first channel information and the second channel information may be directly carried on a ZC sequence and sent to the second device 102. Because the ZC sequence has relatively good auto-correlation characteristics and cross-correlation characteristics, when the second device 102 obtains the channel information from the ZC sequence, relatively good signal demodulation performance can be obtained, and channel information obtaining accuracy can be improved.

The ZC sequence is merely an example. The first channel information and the second channel information may be alternatively carried on another sequence for sending, or may be sent in another manner, provided that the second device 102 can obtain the channel information.

The manner of being carried on the ZC sequence or another sequence is actually a physical-layer sending manner. Actually, channel information may also be transmitted by using Medium Access Control (MAC) signaling, or higher layer signaling, for example, Radio Resource Control (RRC) signaling.

S306: The second device 102 generates a precoding matrix based on the first channel information and the second channel information that are received, and determines, based on the generated precoding matrix, a sending manner to be used for sending data to the first device 101. For a method for determining, by the second device 102, the data sending manner based on the generated precoding matrix, refer to a prior-art method for determining, by a base station, a data sending manner based on a quantized precoding matrix.

S307: The second device 102 sends data to the first device 101 in the determined sending manner.

In step S304, when the first device 101 generates the first channel information, the first device 101 may generate the first channel information for each preset subband in a system frequency band.

This is because it is found from massive simulations and experiments that, phase information of each element in a matrix W is relatively crucial for restoring a channel matrix, and amplitude information of each element in the matrix W is not as important as the phase information. Therefore, when the first device 101 feeds back the channel information, precision of the first channel information is higher than precision of the second channel information. In specific implementation, various means may be used, for example, quantization, a feedback period, and whether channel information is generated for a subband or entire system bandwidth. For example, the first channel information is channel information that is unquantized, and the second channel information is channel information that is quantized. For example, both the first channel information and the second channel information are channel information that is quantized, and a quantity of quantization bits of the first channel information is greater than a quantity of quantization bits of the second channel information. For example, the first channel information is generated for each preset subband in a system frequency band, and the second channel information is generated for entire system bandwidth. For example, a sending period of the first channel information is less than a sending period of the second channel information.

The following separately describes feedbacks of the first channel information and the second channel information in detail.

1. Generation and Feedback Manner of the First Channel Information (1) Quantization Manner For the first channel information, one of the following quantization manners may be used. Manner 1: Skip quantization on the first channel information and directly feed back an analog parameter. Manner 2: Use a high-precision quantization manner for the first channel information.

Using a high-precision quantization manner for the first channel information can ensure precision of the first channel information obtained by the second device 102, so that a relatively precise precoding matrix is obtained, data is sent based on the relatively precise precoding matrix, a relatively good link adaptation effect can be obtained, and system performance is improved.

Optionally, a quantity of quantization bits for quantization of the first channel information is not less than a quantity of quantization bits for quantization of the second channel information. In this way, the first channel information and the second channel information are treated differently. For phase information that is crucial for restoring a channel matrix, high-precision quantization is used; and for amplitude information that is not as crucial, low-precision quantization is used. This can not only ensure channel information feedback precision, but also effectively reduce an information feedback amount, reduce system overheads, and improve data transmission efficiency.

Manner 3: Send the first channel information in groups, where in each group, some information is unquantized, and some information undergoes high-precision quantization.

The first channel information is divided into K groups of first channel sub-information, where K is a positive integer and is a quantity of column vectors included in the precoding matrix W, and each column vector is corresponding to one group of first channel sub-information.

The first channel sub-information further includes basic first channel sub-information. The basic first channel sub-information is phase information of a reference element in a column vector corresponding to the first channel sub-information, a phase of the reference element is non-zero, and the basic first channel sub-information is unquantized. The first channel sub-information further includes L−2 pieces of relative first channel sub-information, where L is a length of the column vector, that is, a quantity of transmit antenna ports of the second device 102. One piece of relative first channel sub-information is corresponding to one element whose phase is non-zero in the column vector other than the reference element, and is used to indicate a deviation between a phase of the corresponding element and the phase of the reference element, and the relative first channel sub-information is channel information that is quantized.

Optionally, a quantity of quantization bits for quantization of the relative first channel sub-information is not less than a quantity of quantization bits for quantization of the second channel information. Likewise, in this way, the first channel information and the second channel information are treated differently. For phase information that is crucial for restoring a channel matrix, high-precision quantization is used; and for amplitude information that is not as crucial, low-precision quantization is used. This can not only ensure channel information feedback precision, but also effectively reduce an information feedback amount, reduce system overheads, and improve data transmission efficiency.

The following describes the manner 3 by using an example.

It is assumed that phase information of any column vector of the matrix W may be expressed as follows:

$$v=(e^{j\varphi 0},e^{j\varphi 1},e^{j\varphi 2},\ldots,e^{j\varphi L-2},1)^T \quad \text{Formula 1}$$

$\varphi_0, \varphi_1, \ldots, \varphi_{L-2}$ are phases of first L−1 elements of a column vector v, and L is the quantity of transmit antenna ports of the second device 102. Any phase is used to represent another phase. For example:

$$v=(e^{j\varphi 0},e^{jd1\varphi 0},e^{jd2\varphi 0},\ldots,e^{jdL-2\varphi 1},1)^T \quad \text{Formula 2}$$

In the formula 2, the reference element is a first element $e^{j\varphi 0}$ (certainly, the reference element may be another element in the column vector, provided that a phase is non-zero). The basic first channel sub-information is used to describe $\varphi_0$, and the first device 101 may feed back $\varphi_0$ by using an analog parameter during the feedback.

$d_1, d_2, \ldots, d_{L-2}$ is information described by the foregoing L−2 pieces of relative first channel sub-information. These related factors may be fed back after quantization.

In this way, for all phase information of a column vector, only one analog parameter and L−2 quantized digital parameters need to be fed back. This reduces overheads compared with a direct feedback of L−1 analog parameters.

(2) Generation Manner

Figure 4:
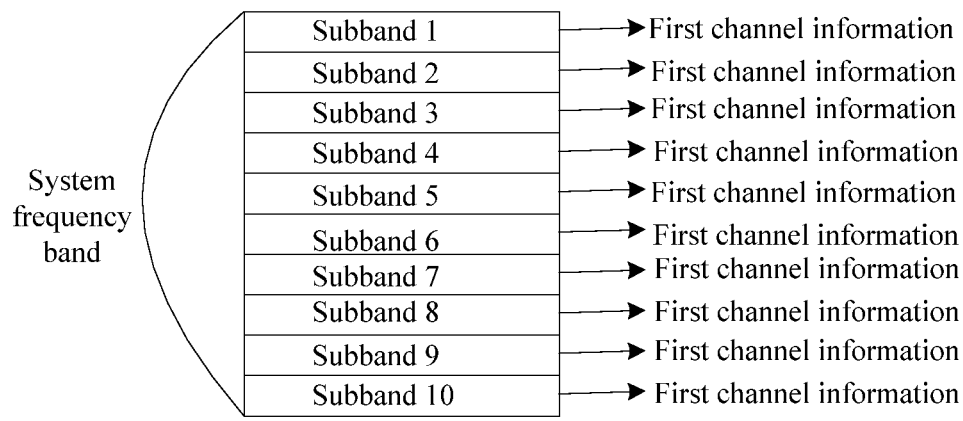
FIG. 4 is a schematic diagram of generating, by a first device, first channel information for each subband in an entire system frequency band according to an embodiment of this application.

Referring to FIG. 4, it is assumed that an entire system frequency band is divided in advance into 10 subbands (subband), for example, a subband 1 to a subband 10 shown in FIG. 4.

Optionally, the first device 101 generates corresponding first channel information for each of the 10 subbands.

Using the LTE system as an example, the first device 101 may measure a precoding matrix by using every P RBs as a group, where P is a positive integer. For example, for a 10 MHz system frequency band (50 resource blocks (Resource Block, RB)), the first device 101 measures a precoding matrix by using every 10 RBs as a group and feeds back phase information of the precoding matrix. This is a subband-based feedback.

In this way, the second device 102 may obtain first channel information of each subband. Compared with a broadband feedback (that is, channel information is fed back for the entire system frequency band), the subband-based feedback has relatively high feedback precision, and can also effectively improve system performance.

A subband width may be a preset value, or may be determined by the first device 101 depending on a specific situation, or may be notified by the second device 102 to the first device 101 by using a message. For example, when the first device 101 performs channel estimation based on the received reference signal and determines that channel quality is relatively good, the first device 101 may set the subband width to a relatively large value; or when the first device 101 determines that channel quality is relatively poor, the first device 101 may set the subband width to a relatively small value, to feed back first channel information with relatively high precision. For another example, the first device 101 may set the subband width based on an amount of to-be-sent data. When the amount of to-be-sent data is relatively small, the first device 101 may set the subband width to a relatively small value. In this case, although overheads of the first channel information are relatively large, system performance is not significantly affected because the amount of to-be-sent data is small. If the amount of to-be-sent data is relatively large, the first device 101 may set the subband width to a relatively large value, to reduce overheads of the first channel information and ensure data sending.

(3) Feedback Period

The first device 101 may feed back the first channel information in a relatively short period, and feed back the second channel information in a relatively long period. In this way, the second device 102 can obtain relatively intensive first channel information, so as to generate a relatively precise precoding matrix.

For example, in the LTE system, if the first device 101 is UE, and the second device 102 is a base station, a period in which the UE sends the first channel information to the base station may be not greater than a PMI feedback period in the current LTE system. For example, a PMI feedback period in a current FDD LTE system is 5 milliseconds (ms), and in this embodiment of this application, a period in which the first device 101 feeds back the first channel information may be 2 ms.

To sum up, when generating and feeding back the first channel information, the first device 101 may generate the first channel information for each subband, feed back the first channel information in a non-quantization analog manner or a high-precision quantization digital manner, and feed back the first channel information in a relatively short feedback period. In this way, the second device 102 can obtain relatively precise and relatively important phase information.

2. Generation and Feedback Manner of the Second Channel Information (1) Quantization Manner For the second channel information, a quantization manner with different precision, in particular, a low-precision quantization manner, may be used. For example, an amplitude value of an element in a matrix W is 0.1855. A value obtained after 2-bit quantization is 0.25, and a value obtained after 4-bit quantization is 0.1875. Quantization precision of the 4-bit quantization is higher than quantization precision of the 2-bit quantization.

(2) Generation Manner

Figure 5:
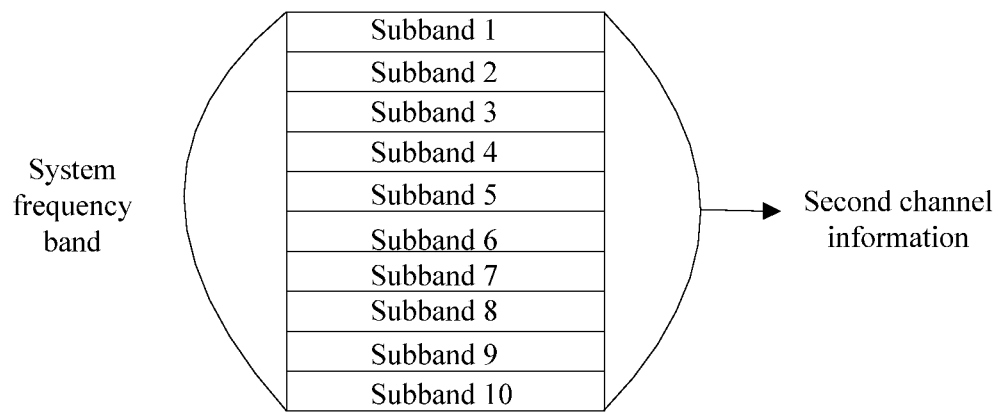
FIG. 5 is a schematic diagram of generating, by a first device, second channel information for an entire system frequency band according to an embodiment of this application.

Referring to FIG. 5, the first device 101 may generate the second channel information for the entire system frequency band, in other words, perform a broadband-based feedback, measure the amplitude information of the matrix W on the entire bandwidth, and feed back the amplitude information.

(3) Feedback Period

The first device 101 may feed back the second channel information in a relatively long period. This can effectively control an amount of information of the second channel information within a unit time and reduce overheads of the second channel information.

Still using the LTE system as an example, if the first device 101 is UE, and the second device 102 is a base station, a period in which the UE sends the second channel information to the base station may be not less than a PMI feedback period in the current LTE system. For example, a PMI feedback period in a current FDD LTE system is 5 milliseconds (ms), and in this embodiment of this application, a period in which the first device 101 feeds back the second channel information may be 5 ms, 10 ms, or the like.

To sum up, when generating and feeding back the second channel information, the first device 101 may generate the second channel information for the entire system frequency band, feed back the second channel information in a low-precision quantization digital manner, and feed back the second channel information in a relatively long feedback period. This can reduce overheads of the second channel information to the greatest extent and improve system performance.

In addition, another manner is that the first device 101 does not send the second channel information, and sends only the first channel information to the second device 102. In other words, in step S304, the first device 101 does not generate the second channel information, and in step S305, the first device 101 does not send the second channel information either.

After receiving the first channel information, the second device 102 may generate the precoding matrix by using a preset amplitude value as an amplitude value of each element in the precoding matrix; or the second device 102 may determine an amplitude value based on information such as a rank value or a quantity of transmit antenna ports, and then generate the precoding matrix by using the determined amplitude value as an amplitude value of each element in the precoding matrix. Because the first channel information is available and the first channel information may be fed back with relatively high precision, precision of the first channel information obtained by the second device 102 can be ensured, so that a relatively precise precoding matrix is obtained, data is sent based on the relatively precise precoding matrix, a relatively good link adaptation effect can be obtained, and system performance is improved.

Certainly, if the first device 101 generates and feeds back the second channel information to the second device 102, channel information obtained by the second device 102 is more precise, a restored precoding matrix is more precise, and a better link adaptation effect can be obtained.

The following describes, by using an example, a manner of obtaining a precoding matrix based on a channel matrix H in the procedure shown in FIG. 3. Herein, for example, SVD decomposition is performed on the channel matrix H to obtain the precoding matrix. A useable decomposition manner is not limited to the SVD decomposition manner, provided that the precoding matrix can be obtained based on the channel matrix H. Alternatively, the matrix H may be a covariance matrix of the channel matrix, provided that the matrix can represent channel characteristics.

The first device 101 may perform eigenvalue decomposition on the channel matrix H based on the following formula 3, to obtain an eigenvector of the channel matrix H:

$$H = U\acute{O}V \quad \text{Formula 3}$$

$\acute{O}$ is a diagonal matrix and V is a matrix including the eigenvector of the channel matrix H. A rank (Rank) and an SNR of the channel matrix H may be obtained based on $\acute{O}$, and a precoding matrix W of a channel may be obtained based on V, where a quantity of columns of the matrix W may be equal to the rank of the channel matrix H.

FIG. 6 shows a procedure of a second channel information reporting solution according to an embodiment of this application. As shown in FIG. 6, the procedure includes the following steps.

S601: A second device 102 sends a reference signal to a first device 101, where the reference signal is used to perform channel estimation on a channel from the second device 102 to the first device 101.

For step S601, refer to step S301.

S602: The first device 101 performs channel estimation based on the reference signal, to obtain a precoding matrix, which is marked as W herein.

Refer to steps S302 and S303. That is, the second device 102 performs channel estimation based on the reference signal to obtain the channel matrix H, and then decomposes the channel matrix H to obtain the precoding matrix.

Alternatively, the first device 101 may use a method in a current LTE system and obtain the precoding matrix when performing channel estimation based on the reference signal.

The precoding matrix W is an Nt-row R-column matrix, and $$W = \begin{bmatrix} X & 0 \\ 0 & X \end{bmatrix} \times W_2;$$

X is an Nt/2-row M-column matrix, and $X=[b_0, b_1, \ldots, b_{M-1}]$; $b_i$ is a column vector whose dimensionality is Nt/2, and $0 \leq i \leq M-1$; Nt is a quantity of antenna ports for sending the reference signal by the second device; $W_2$ is a 2M-row R-column matrix, and $$W_2 = \begin{bmatrix} e_{k_0} & e_{k_1} & \cdots & e_{k_{R-1}} \\ \phi_0 e_{k_0} & \phi_1 e_{k_1} & \cdots & \phi_{R-1} e_{k_{R-1}} \end{bmatrix},$$

where $e_{k_m}$ is a unit vector whose dimensionality is M, a value only of a $k_m^{th}$ element is 1, values of other elements are all 0, and $0 \leq m \leq R-1$; $\phi_n$ is a complex number whose modulus is 1, and $0 \leq n \leq R-1$; M, R, and Nt are all positive integers, and Nt is an even number. $b_i$ may be an eigenvector of the channel matrix, or may be a DFT vector.

S603: The first device 101 generates third channel information, fourth channel information, and fifth channel information that are used to describe the precoding matrix W.

The third channel information is used to indicate X.

The fourth channel information is used to indicate $e_{k_0}, \ldots, e_{k_m}, \ldots,$ and $e_{k_{R-1}}$.

The fifth channel information is used to indicate $\phi_0, \ldots, \phi_n, \ldots,$ and $\phi_{R-1}$.

Precision of the third channel information is lower than precision of the fifth channel information.

S604: The first device 101 sends the third channel information, the fourth channel information, and the fifth channel information that are generated to the second device 102.

The first device 101 directly adds one or more of the third channel information, the fourth channel information, and the fifth channel information to a ZC sequence, and sends the information to the second device 102, without undergoing an encoding or modulation process. For example, the first device 101 may directly add unquantized information in the third channel information, the fourth channel information, and the fifth channel information to the ZC sequence, and sends the information to the second device 102. Because the ZC sequence has relatively good auto-correlation characteristics and cross-correlation characteristics, when the second device 102 obtains the channel information from the ZC sequence, relatively good signal demodulation performance can be obtained, and channel information obtaining accuracy can be improved.

The ZC sequence is merely an example. The third channel information, the fourth channel information, and the fifth channel information may be alternatively carried on another sequence for sending, provided that the second device 102 can obtain the channel information.

The manner of being carried on the ZC sequence or another sequence is actually a physical-layer sending manner. Actually, channel information may also be transmitted by using Medium Access Control (MAC) signaling, or higher layer signaling, for example, Radio Resource Control (RRC) signaling.

S605: The second device 102 generates a precoding matrix based on the third channel information, the fourth channel information, and the fifth channel information that are received, and determines, based on the generated precoding matrix, a sending manner to be used for sending data to the first device 101. For a method for determining, by the second device 102, the data sending manner based on the generated precoding matrix, refer to a prior-art method for determining, by a base station, a data sending manner based on a quantized precoding matrix.

S606: The second device 102 sends data to the first device 101 in the determined sending manner.

The third channel information, the fourth channel information, and the fifth channel information are used by the second device 102 to determine the precoding matrix, and the precoding matrix is obtained from channel estimation performed by the first device 101 based on the reference signal sent by the second device 102.

Optionally, the column vector in X may be a discrete Fourier transform (DFT) vector, or may be an unquantized or a quantized column vector that is obtained from channel matrix decomposition.

For example, referring to the following formula 4, the precoding matrix W includes two codebooks W1 and W2:

$$W = W_1 \times W_2 \qquad \text{Formula 4}$$

where, $$W_1 = \begin{bmatrix} X & 0 \\ 0 & X \end{bmatrix} = \begin{bmatrix} b_0 & b_1 & \ldots & b_{M-1} & 0 & 0 & \ldots & 0 \\ 0 & 0 & \ldots & 0 & b_0 & b_1 & \ldots & b_{M-1} \end{bmatrix}.$$

$b_0, b_1, \ldots, b_{M-1}$ are examples of M vectors included in X. Optionally, are column vectors obtained after SVD decomposition is performed on the channel matrix H. The vectors are obtained from long-term statistics and are unquantized.

A vector $b_i$ is a column vector whose length is a quantity of transmit antenna ports of the second device 102 (for example, a base station). A value of M may be a preset value, or a value preconfigured by the second device 102.

For example, if a period in which the first device 101 feeds back channel information is 20 ms, a channel measurement period is 5 ms, and the channel matrix H is a 4×4 matrix, statistics is collected on a total of 16 column vectors in 20 ms. The value of M may be preset to 4, or may be preconfigured by the second device 102 to a value, for example, 2, 4, or 8.

When a channel matrix rank is equal to 1:

$$W_2 = \begin{bmatrix} e_{k_0} \\ \phi_0 e_{k_0} \end{bmatrix} \qquad \text{Formula 5}$$

When a channel matrix rank is equal to 2:

$$W_2 = \begin{bmatrix} e_{k_0} & e_{k_1} \\ \phi_0 e_{k_0} & -\phi_1 e_{k_1} \end{bmatrix} \qquad \text{Formula 6}$$

where, $W_1$ indicates a set of M column vectors, $W_2$ indicates a specific direction of a beam, and $W_2$ includes column selection information $e_{k_m}$ and co-phasing (co-phasing) information $\phi_n$.

Co-phasing information $\phi_n$ is a phase deviation between two polarization directions of a transmit antenna of the second device 102, and may be any value in a range of 0 to $2\pi$. When the first device 101 sends information to the second device 102, quantization may be not performed on the information, and the information may be fed back by using an analog parameter. The co-phasing information is an example of the fifth channel information.

A circumstance in which the rank of the channel matrix is another value may be deduced by using the formulas 5 and 6. If the rank is equal to m (m is a positive integer), $W_2$ includes m column vectors.

Figure 7:
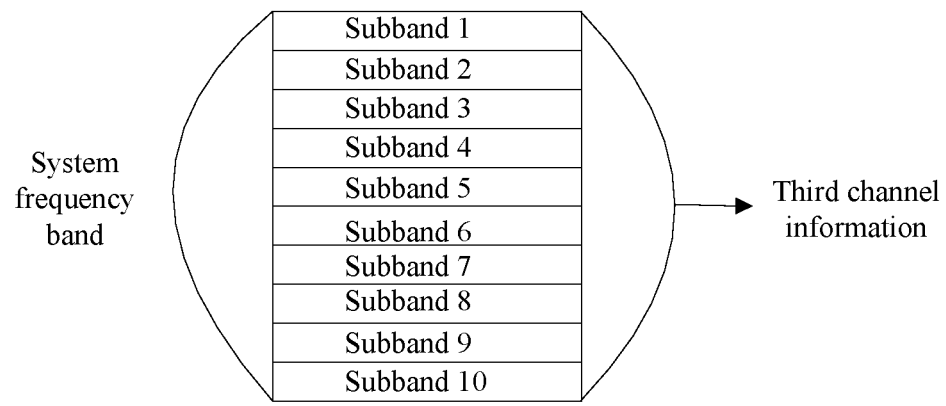
FIG. 7 is a schematic diagram of generating, by a first device, third channel information for an entire system frequency band according to an embodiment of this application.

In step S603, when generating the third channel information, the first device 101 may obtain the third channel information for the entire system frequency band. For details, refer to FIG. 7. For example, as described earlier, the entire system frequency band is divided into 10 subbands: a subband 1 to a subband 10, and the first device 101 generates the third channel information for the entire system frequency band.

When generating the fourth channel information, the first device 101 may generate the fourth channel information for each subband of the entire system frequency band.

When generating the fifth channel information, the first device 101 may generate the fifth channel information for each subband of the entire system frequency band.

Optionally, the third channel information, the fourth channel information, and the fifth channel information can all be fed back periodically, and a feedback period of the fifth channel information is less than a feedback period of the third channel information.

It is found from massive simulations and experiments that, in the matrix W, $W_2$ is relatively crucial for restoring the channel matrix, and $W_1$ is not as important as $W_2$. Therefore, when the first device 101 feeds back channel information, precision of the fifth channel information is higher than precision of the third channel information. For example, various manners may be used, for example, quantization, a feedback period, and whether a feedback is for a subband or entire system bandwidth, to implement that the precision of the fifth channel information is higher than the precision of the third channel information. This can not only ensure channel information feedback precision, but also effectively reduce a feedback amount representing the channel information.

The following describes generation and sending manners of various channel information in detail.

1. Generation and Feedback Manner of the Third Channel Information (1) Quantization Manner Manner 1: Skip quantization on the third channel information and directly feed back an analog parameter.

Manner 2: A quantity of quantization bits for quantization of the third channel information is less than a quantity of quantization bits for quantization of the fifth channel information.

(2) Generation Manner

As described earlier, when generating the third channel information, the first device 101 may generate the third channel information for the entire system frequency band.

(3) Feedback Period

The first device 101 may send the third channel information in a relatively long period, and send the fifth channel information in a relatively short period. By properly setting the feedback period of the third channel information, an amount of the third channel information can be effectively reduced.

Still using the LTE system as an example, if the first device 101 is UE, and the second device 102 is a base station, a period in which the UE sends the third channel information to the base station may be not less than a PMI feedback period in the current LTE system. For example, a PMI feedback period in a current FDD LTE system is 5 ms, and in this embodiment of this application, a period in which the first device 101 feeds back the third channel information may be 5 ms, 10 ms, or the like.

Figure 8:
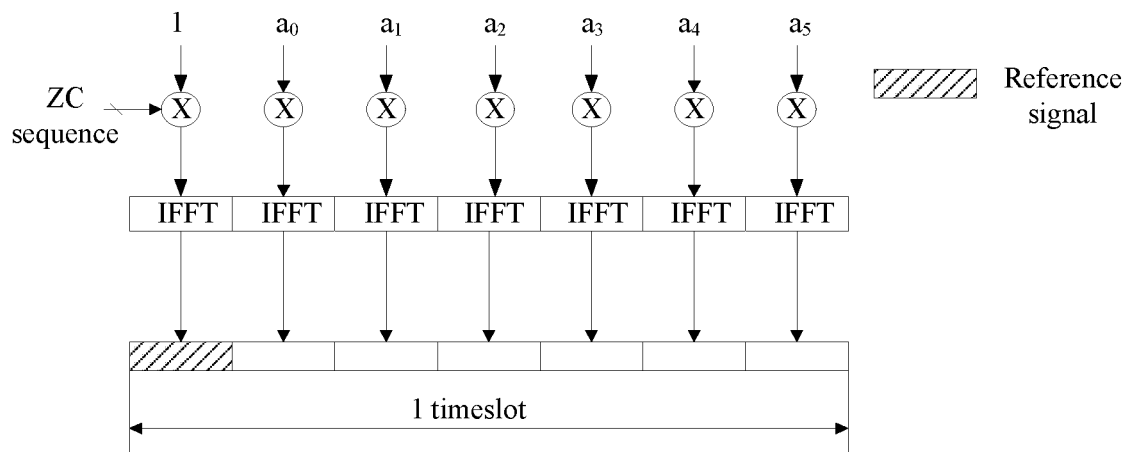
FIG. 8 is a schematic diagram of modulating, by a first device, third channel information onto a ZC sequence for sending according to an embodiment of this application.

The double-codebook structure shown in the formula 4 is used as an example. Referring to FIG. 8, the first device 101 may modulate valid information $a_i$ in $W_1$ onto a ZC sequence and send the ZC sequence to the second device 102. A signal corresponding to a slash part is a reference signal. In the figure, IFFT represents Inverse Fast Fourier Transform (Inverse Fast Fourier Transform).

To sum up, when generating and feeding back the third channel information, the first device 101 may generate the third channel information for the entire system frequency band, feed back the third channel information in a low-precision quantization digital manner, and feed back the third channel information in a relatively long feedback period. This can effectively reduce the amount of the third channel information.

2. Generation and Feedback Manner of the Fourth Channel Information (1) Quantization Manner The fourth channel information is fed back in a digital manner.

(2) Generation Manner

Figure 9:
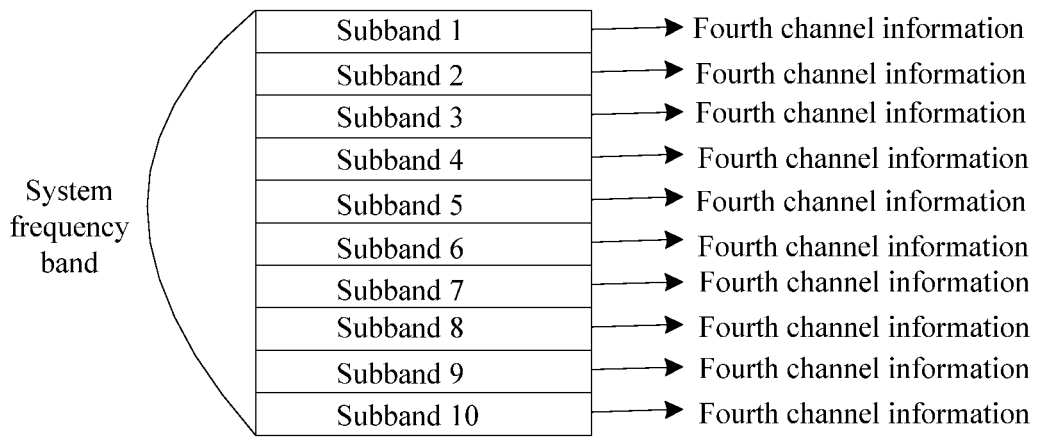
FIG. 9 is a schematic diagram of generating, by a first device, fourth channel information for each subband in an entire system frequency band according to an embodiment of this application.

As described earlier, when generating the fourth channel information, the first device 101 may generate the fourth channel information for each subband of the system frequency band. For details, refer to FIG. 9.

(3) Feedback Period

The first device 101 may send the fourth channel information in a relatively short period. By properly setting the feedback period of the fourth channel information, the second device 102 can obtain relatively intensive fourth channel information, and generate a relatively precise precoding matrix.

Still using the LTE system as an example, if the first device 101 is UE, and the first device 102 is a base station, a period in which the UE sends the fourth channel information to the base station may be not greater than a PMI feedback period in the current LTE system. For example, a PMI feedback period in a current FDD LTE system is 5 ms, and in this embodiment of this application, a period in which the first device 101 feeds back the fourth channel information may be 2 ms or the like.

To sum up, when generating and feeding back the fourth channel information, the first device 101 may generate the fourth channel information for each subband of the system frequency band, feed back the fourth channel information in a digital manner, and feed back the fourth channel information in a relatively short feedback period. This can effectively improve feedback precision of the fourth channel information, so that the second device 102 can generate a relatively precise precoding matrix.

2. Generation and Feedback Manner of the Fifth Channel Information (1) Quantization Manner For the fifth channel information, one of the following quantization manners may be used:

Manner 1: Skip quantization on the fifth channel information and directly feed back an analog parameter.

Manner 2: Use a high-precision quantization manner for the fifth channel information.

By setting a quantity of quantization bits of the fifth channel information, quantization precision of the fifth channel information can be effectively controlled, so that precision of the fifth channel information obtained by the second device 102 can be ensured, a relatively precise precoding matrix is obtained, data is sent based on the relatively precise precoding matrix, a relatively good link adaptation effect can be obtained, and system performance is improved.

(2) Generation Manner

Figure 10:
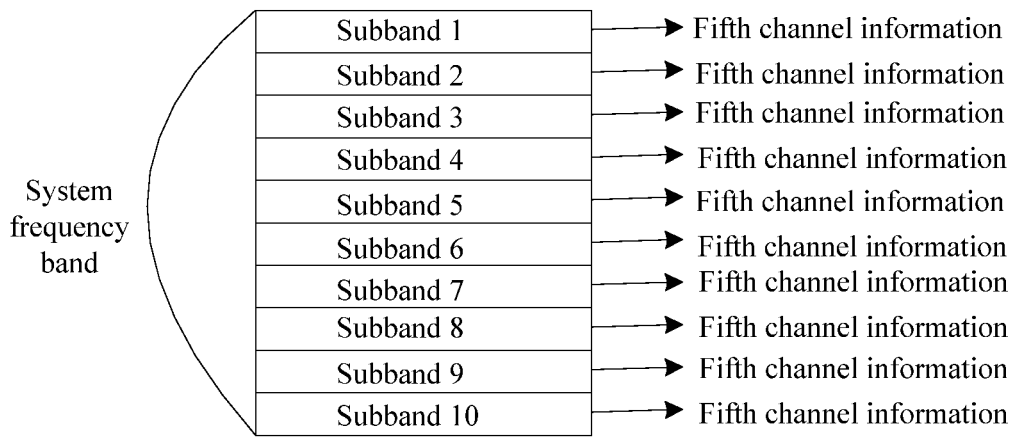
FIG. 10 is a schematic diagram of generating, by a first device, fifth channel information for each subband in an entire system frequency band according to an embodiment of this application.

As described earlier, when generating the fifth channel information, the first device 101 may generate the fifth channel information for each subband of the system frequency band. For details, refer to FIG. 10.

(3) Feedback Period

The first device 101 may send the fifth channel information in a relatively short period. By properly setting the feedback period of the fifth channel information, the second device 102 can obtain relatively intensive fifth channel information, and generate a relatively precise precoding matrix.

Still using the LTE system as an example, if the first device 101 is UE, and the second device 102 is a base station, a period in which the UE sends the fifth channel information to the base station may be not greater than a PMI feedback period in the current LTE system. For example, a PMI feedback period in a current FDD LTE system is 5 ms, and in this embodiment of this application, a period in which the first device 101 feeds back the fifth channel information may be 2 ms or the like.

To sum up, when generating and feeding back the fifth channel information, the first device 101 may generate the fifth channel information for each subband of the system frequency band, feed back the fifth channel information in a non-quantization analog manner or a high-precision quantization digital manner, and feed back the fifth channel information in a relatively short feedback period. This can effectively improve feedback precision of the fifth channel information, so that the second device 102 can generate a relatively precise precoding matrix.

In addition, the period in which the first device 101 sends the third channel information is not less than the period in which the first device 101 sends the fourth channel information, and is not less than the period in which the first device 101 sends the fifth channel information.

If both the third channel information and the fifth channel information are fed back after quantization, a quantity of quantization bits for quantization of the third channel information is not greater than a quantity of quantization bits for quantization of the fifth channel information.

Figure 11:
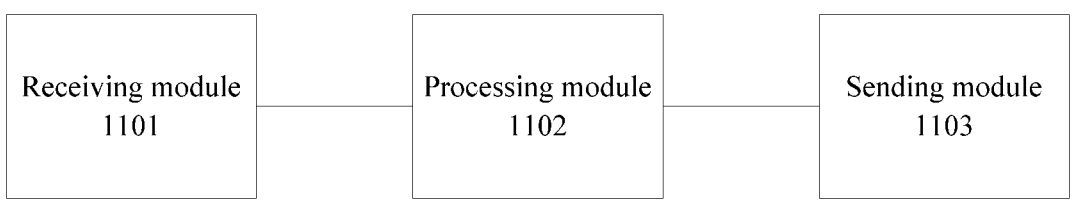
FIG. 11 is a schematic structural diagram of a first first-device according to an embodiment of this application.

FIG. 11 is a schematic structural diagram of a first first-device according to an embodiment of this application. As shown in FIG. 11, the first device includes a receiving module 1101, a processing module 1102, and a sending module 1103.

In a first optional implementation. The receiving module 1101 is configured to receive a reference signal from a second device. The processing module 1102 is configured to obtain a precoding matrix based on the reference signal received by the receiving module 1101, and generate first channel information and second channel information that are used to indicate the precoding matrix. The sending module 1103 is configured to send the first channel information and the second channel information to the second device. Precision of the first channel information is higher than precision of the second channel information. The first channel information includes phase information of each element in the precoding matrix, and the second channel information includes amplitude information of each element in the precoding matrix.

For another optional implementation of the apparatus, refer to the foregoing implementation in which the first device 101 generates and feeds back the first channel information and the second channel information. The receiving module 1101 may be configured to implement receiving operations of the first device 101, for example, receiving the reference signal, data, and control information. The processing module 1102 may be configured to implement processing operations of the first device 101, for example, performing channel estimation based on the reference signal and generating channel information. The sending module 1103 may be configured to implement sending operations of the first device 101, for example, sending the channel information, data, and control information.

In a second optional implementation, the receiving module 1101 is configured to receive a reference signal from a second device. The processing module 1102 is configured to obtain a precoding matrix W based on the reference signal received by the receiving module 1101. W is an Nt-row R-column matrix, and $$W = \begin{bmatrix} X & 0 \\ 0 & X \end{bmatrix} \times W_2;$$

X is an Nt/2-row M-column matrix, and X=[$b_0$, $b_1$, ..., $b_{M-1}$]; $b_i$ is a column vector whose dimensionality is Nt/2, and $0 \le i \le M-1$; Nt is a quantity of antenna ports for sending the reference signal by the second device; $W_2$ is a 2M-row R-column matrix, and $$W_2 = \begin{bmatrix} e_{k_0} & e_{k_1} & \cdots & e_{k_{R-1}} \\ \phi_0 e_{k_0} & \phi_1 e_{k_1} & \cdots & \phi_{R-1} e_{k_{R-1}} \end{bmatrix},$$

where $e_{k_m}$ is a unit vector whose dimensionality is M, a value only of a $k_m^{th}$ element is 1, values of other elements are all 0, and $0 \le m \le R-1$; $\phi_n$ is a complex number whose modulus is 1, and $0 \le n \le R-1$; M, R, and Nt are all positive integers, and Nt is an even number. The processing module 1102 is further configured to generate third channel information, fourth channel information, and fifth channel information. The third channel information is used to indicate X. The fourth channel information is used to indicate $e_{k_0}$, ..., $e_{k_m}$, ..., and $e_{k_{R-1}}$. The fifth channel information is used to indicate $\phi_0$, ..., $\phi_n$, ..., and $\phi_{R-1}$. Precision of the third channel information is lower than precision of the fifth channel information. The sending module 1103 is configured to send the third channel information, the fourth channel information, and the fifth channel information to the second device.

For another optional implementation of the apparatus, refer to the foregoing implementation in which the first device 101 generates and feeds back the third channel information, the fourth channel information, and the fifth channel information. The receiving module 1101 may be configured to implement receiving operations of the first device 101, for example, receiving the reference signal, data, and control information. The processing module 1102 may be configured to implement processing operations of the first device 101, for example, performing channel estimation based on the reference signal and generating channel information. The sending module 1103 may be configured to implement sending operations of the first device 101, for example, sending the channel information, data, and control information.

Figure 12:
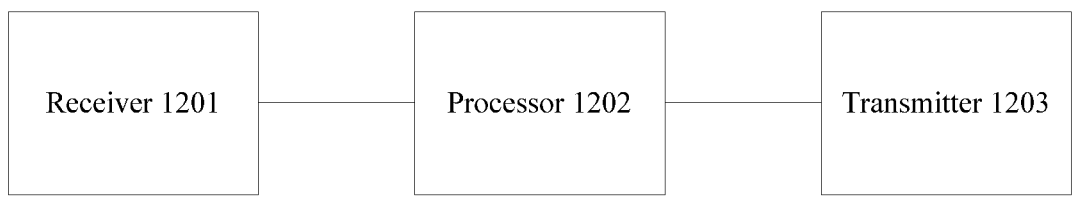
FIG. 12 is a schematic structural diagram of a second first-device according to an embodiment of this application.

FIG. 12 is a schematic structural diagram of a second first-device according to an embodiment of this application. As shown in FIG. 12, the first device includes a receiver 1201, a processor 1202, and a transmitter 1203.

In a first optional implementation. The receiver 1201 is configured to receive a reference signal from a second device. The processor 1202 is configured to obtain a precoding matrix based on the reference signal received by the receiver 1201, and generate first channel information and second channel information that are used to indicate the precoding matrix. The transmitter 1203 is configured to send the first channel information and the second channel information to the second device. Precision of the first channel information is higher than precision of the second channel information. The first channel information includes phase information of each element in the precoding matrix, and the second channel information includes amplitude information of each element in the precoding matrix.

For another optional implementation of the apparatus, refer to the foregoing implementation in which the first device 101 generates and feeds back the first channel information and the second channel information. The receiver 1201 may be configured to implement receiving operations of the first device 101, for example, receiving the reference signal, data, and control information. The processor 1202 may be configured to implement processing operations of the first device 101, for example, performing channel estimation based on the reference signal and generating channel information. The transmitter 1203 may be configured to implement sending operations of the first device 101, for example, sending the channel information, data, and control information.

In a second optional implementation, the receiver 1201 is configured to receive a reference signal from a second device. The processor 1202 is configured to obtain a precoding matrix W based on the reference signal received by the receiver 1201. W is an Nt-row R-column matrix, and $$W = \begin{bmatrix} X & 0 \\ 0 & X \end{bmatrix} \times W_2;$$

X is an Nt/2-row M-column matrix, and $X=[b_0, b_1, \ldots, b_{M-1}]$; $b_i$ is a column vector whose dimensionality is Nt/2, and $0 \leq i \leq M-1$; Nt is a quantity of antenna ports for sending the reference signal by the second device; $W_2$ is a 2M-row R-column matrix, and $$W_2 = \begin{bmatrix} e_{k_0} & e_{k_1} & \cdots & e_{k_{R-1}} \\ \phi_0 e_{k_0} & \phi_1 e_{k_1} & \cdots & \phi_{R-1} e_{k_{R-1}} \end{bmatrix},$$

where $e_{k_m}$ is a unit vector whose dimensionality is M, a value only of a $k_m^{th}$ element is 1, values of other elements are all 0, and $0 \leq m \leq R-1$; $\phi_n$ is a complex number whose modulus is 1, and $0 \leq n \leq R-1$; M, R, and Nt are all positive integers, and Nt is an even number. The processor 1202 is further configured to generate third channel information, fourth channel information, and fifth channel information. The third channel information is used to indicate X. The fourth channel information is used to indicate $e_{k_0}, \ldots, e_{k_m}, \ldots, e_{k_{R-1}}$. The fifth channel information is used to indicate $\phi_0, \ldots, \phi_n, \ldots,$ and $\phi_{R-1}$. Precision of the third channel information is lower than precision of the fifth channel information; and the transmitter 1203 is configured to send the third channel information, the fourth channel information, and the fifth channel information to the second device.

For another optional implementation of the apparatus, refer to the foregoing implementation in which the first device 101 generates and feeds back the third channel information, the fourth channel information, and the fifth channel information. The receiver 1201 may be configured to implement receiving operations of the first device 101, for example, receiving the reference signal, data, and control information. The processor 1202 may be configured to implement processing operations of the first device 101, for example, performing channel estimation based on the reference signal and generating channel information. The transmitter 1203 may be configured to implement sending operations of the first device 101, for example, sending the channel information, data, and control information.

Figure 13:
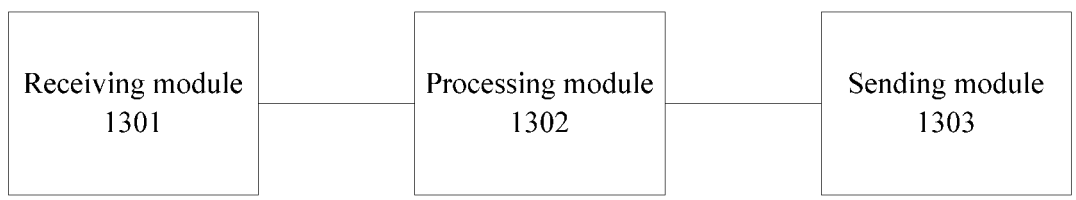
FIG. 13 is a schematic structural diagram of a first second-device according to an embodiment of this application.

FIG. 13 is a schematic structural diagram of a first second-device according to an embodiment of this application. As shown in FIG. 13, the second device includes a receiving module 1301, a processing module 1302, and a sending module 1303.

In a first optional implementation, the sending module 1303 is configured to send a reference signal to a first device. The receiving module 1301 is configured to receive first channel information and second channel information from the first device, where the first channel information and the second channel information are used to indicate a precoding matrix, and the precoding matrix is obtained by the first device based on the received reference signal. Precision of the first channel information is higher than precision of the second channel information. The first channel information includes phase information of each element in the precoding matrix, and the second channel information includes amplitude information of each element in the precoding matrix. The processing module 1302 is configured to determine the precoding matrix based on the first channel information and the second channel information. The sending module 1303 is further configured to send data to the first device based on the precoding matrix determined by the processing module 1302.

For another optional implementation of the apparatus, refer to the foregoing implementation in which the second device 102 receives the first channel information and the second channel information. The receiving module 1301 may be configured to implement receiving operations of the second device 102, for example, receiving channel information, data, and other control information. The processing module 1302 may be configured to implement processing operations of the second device 102, for example, generating the precoding matrix based on the channel information, and determining a data sending manner based on the generated precoding matrix. The sending module 1303 may be configured to implement sending operations of the second device 102, for example, sending the reference signal, data, and control information.

In a second optional implementation, the sending module 1303 is configured to send a reference signal to a first device. The receiving module 1301 is configured to receive third channel information, fourth channel information, and fifth channel information from the first device, where precision of the third channel information is lower than precision of the fifth channel information. The processing module 1302 is configured to determine a precoding matrix W based on the third channel information, the fourth channel information, and the fourth channel information. The sending module 1303 is configured to send data to the first device based on the precoding matrix W determined by the processing module 1302. The precoding matrix W is obtained by the first device based on the received reference signal; W is an Nt-row R-column matrix, and $$W = \begin{bmatrix} X & 0 \\ 0 & X \end{bmatrix} \times W_2;$$

X is an Nt/2-row M-column matrix, and $X=[b_0, b_1, \ldots, b_{M-1}]$; $b_i$ is a column vector whose dimensionality is Nt/2, and $0 \leq i \leq M-1$; Nt is a quantity of antenna ports for sending the reference signal by the second device; $W_2$ is a 2M-row R-column matrix, and $$W_2 = \begin{bmatrix} e_{k_0} & e_{k_1} & \cdots & e_{k_{R-1}} \\ \phi_0 e_{k_0} & \phi_1 e_{k_1} & \cdots & \phi_{R-1} e_{k_{R-1}} \end{bmatrix},$$

where $e_{k_m}$ is a unit vector whose dimensionality is M, a value only of a $k_m^{th}$ element is 1, values of other elements are all 0, and $0 \leq m \leq R-1$; $\phi_n$ is a complex number whose modulus is 1, and $0 \leq n \leq R-1$; M, R, and Nt are all positive integers, and Nt is an even number. The third channel information is used to indicate X. The fourth channel information is used to indicate $e_{k_0}, \ldots, e_{k_m}, \ldots,$ and $e_{k_{R-1}}$. The fifth channel information is used to indicate $\phi_0, \ldots, \phi_n, \ldots,$ and $\phi_{R-1}$.

For another optional implementation of the apparatus, refer to the foregoing implementation in which the second device 102 receives the third channel information, the fourth channel information, and the fifth channel information. The receiving module 1301 may be configured to implement receiving operations of the second device 102, for example, receiving channel information, data, and other control information. The processing module 1302 may be configured to implement processing operations of the second device 102, for example, generating the precoding matrix based on the channel information, and determining a data sending manner based on the generated precoding matrix. The sending module 1303 may be configured to implement sending operations of the second device 102, for example, sending the reference signal, data, and control information.

Figure 14:
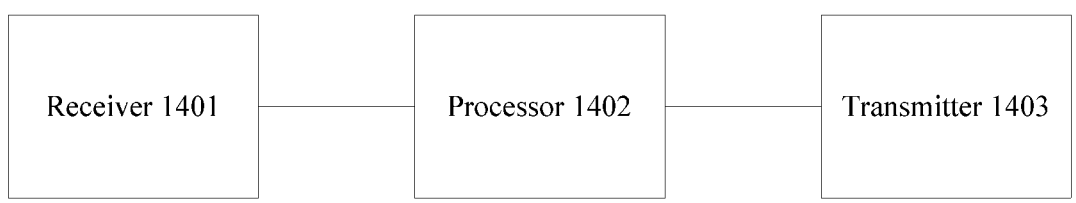
FIG. 14 is a schematic structural diagram of a second second-device according to an embodiment of this application.

FIG. 14 is a schematic structural diagram of a second second-device according to an embodiment of this application. As shown in FIG. 14, the second device includes a receiver 1401, a processor 1402, and a transmitter 1403.

In a first optional implementation, the transmitter 1403 is configured to send a reference signal to a first device. The receiver 1401 is configured to receive first channel information and second channel information from the first device, where the first channel information and the second channel information are used to indicate a precoding matrix, and the precoding matrix is obtained by the first device based on the received reference signal. Precision of the first channel information is higher than precision of the second channel information. The first channel information includes phase information of each element in the precoding matrix, and the second channel information includes amplitude information of each element in the precoding matrix. The processor 1402 is configured to determine the precoding matrix based on the first channel information and the second channel information. The transmitter 1403 is further configured to send data to the first device based on the precoding matrix determined by the processor 1402.

For another optional implementation of the apparatus, refer to the foregoing implementation in which the second device 102 receives the first channel information and the second channel information. The receiver 1401 may be configured to implement receiving operations of the second device 102, for example, receiving channel information, data, and other control information. The processor 1402 may be configured to implement processing operations of the second device 102, for example, generating the precoding matrix based on the channel information, and determining a data sending manner based on the generated precoding matrix. The transmitter 1403 may be configured to implement sending operations of the second device 102, for example, sending the reference signal, data, and control information.

In a second optional implementation, the transmitter 1403 is configured to send a reference signal to a first device. The receiver 1401 is configured to receive third channel information, fourth channel information, and fifth channel information from the first device, where precision of the third channel information is lower than precision of the fifth channel information. The processor 1402 is configured to determine a precoding matrix W based on the third channel information, the fourth channel information, and the fifth channel information. The transmitter 1403 is configured to send data to the first device based on the precoding matrix W determined by the processor 1402. The precoding matrix W is obtained by the first device based on the received reference signal; W is an Nt-row R-column matrix, and $$W = \begin{bmatrix} X & 0 \\ 0 & X \end{bmatrix} \times W_2;$$

X is an Nt/2-row M-column matrix, and $X = [b_0, b_1, \ldots, b_{M-1}]$; $b_i$ is a column vector whose dimensionality is Nt/2, and $0 \le i \le M-1$; Nt is a quantity of antenna ports for sending the reference signal by the second device; $W_2$ is a 2M-row R-column matrix, and $$W_2 = \begin{bmatrix} e_{k_0} & e_{k_1} & \cdots & e_{k_{R-1}} \\ \phi_0 e_{k_0} & \phi_1 e_{k_1} & \cdots & \phi_{R-1} e_{k_{R-1}} \end{bmatrix},$$

where $e_{k_m}$ is a unit vector whose dimensionality is M, a value only of a $k_m^{th}$ element is 1, values of other elements are all 0, and $0 \le m \le R-1$; $\phi_n$ is a complex number whose modulus is 1, and $0 \le n \le R-1$; M, R, and Nt are all positive integers, and Nt is an even number. The third channel information is used to indicate X. The fourth channel information is used to indicate $e_{k_0}, \ldots, e_{k_m}, \ldots,$ and $e_{k_{R-1}}$; and the fifth channel information is used to indicate $\phi_0, \ldots, \phi_n, \ldots,$ and $\phi_{R-1}$.

For another optional implementation of the apparatus, refer to the foregoing implementation in which the second device 102 receives the third channel information, the fourth channel information, and the fifth channel information. The receiver 1401 may be configured to implement receiving operations of the second device 102, for example, receiving channel information, data, and other control information. The processor 1402 may be configured to implement processing operations of the second device 102, for example, generating the precoding matrix based on the channel information, and determining a data sending manner based on the generated precoding matrix. The transmitter 1403 may be configured to implement sending operations of the second device 102, for example, sending the reference signal, data, and control information.

To sum up, the embodiments of this application provide the channel information transmission apparatus and method, and the system. When information, in channel information, that is relatively crucial for restoring a channel matrix and that requires high precision is fed back, relatively high feedback precision is used. Information that is not as crucial for restoring the channel matrix and that does not require high precision is fed back with relatively low feedback precision. This effectively reduces system overheads and improves system performance while ensuring channel information precision.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A first device, comprising:
a receiver configured to receive a reference signal from a second device;
a processor;
a non-transitory computer-readable storage medium storing a program to be executed by the processor, the program including instructions for:
obtaining a precoding matrix in accordance with the reference signal; and
generating first channel information and second channel information corresponding to the precoding matrix; and
a transmitter configured to send the first channel information and the second channel information to the second device, wherein:
the first channel information corresponds to a first frequency band, the second channel information corresponds to a second frequency band, and the second frequency band is wider than the first frequency band such that the first channel information is more precise than the second channel information;
the first channel information comprises phase information of each element in the precoding matrix; and
the second channel information comprises amplitude information of each element in the precoding matrix;
wherein the instructions comprise further instructions to generate the first channel information to comprise K groups of first channel sub-information;
wherein K is a positive integer and is equal to a quantity of column vectors comprised in the precoding matrix;
wherein each column vector corresponds to one group of first channel sub-information;
wherein the first channel sub-information comprises:
basic first channel sub-information, wherein the basic first channel sub-information is phase information of a reference element in a column vector corresponding to the first channel sub-information, and a phase of the reference element is non-zero; and L−2 pieces of relative first channel sub-information, wherein L is a length of the column vector, each of the L−2 pieces relative first channel sub-information corresponds to an element in the column vector whose phase is non-zero other than the reference element, and each of the L−2 pieces relative first channel sub-information indicates a deviation between a phase of the element corresponding to a respective piece of the first channel sub-information and the phase of the reference element; and
wherein the basic first channel sub-information is unquantized, and the L−2 pieces of relative first channel sub-information is quantized.

2. The first device according to claim 1, wherein the instructions comprise further instructions to:
generate the first channel information as unquantized; and
generate the second channel information as quantized.

3. The first device according to claim 1, wherein the instructions comprise further instructions to:
generate the first channel information as quantized; and
generate the second channel information as quantized, wherein a quantity of quantization bits of the first channel information is greater than a quantity of quantization bits of the second channel information.

4. The first device of claim 1, wherein the first frequency band is a subband of the second frequency band.

5. A second device, comprising:
a transmitter configured to send a reference signal to a first device;
a receiver configured to receive first channel information and second channel information from the first device, wherein the first channel information and the second channel information indicates a precoding matrix, and the precoding matrix is obtained by the first device in accordance with the reference signal, wherein the first channel information more precise than the second channel information, the first channel information comprises phase information of each element in the precoding matrix, and the second channel information comprises amplitude information of each element in the precoding matrix;
a processor; and
a non-transitory computer-readable storage medium storing a program to be executed by the processor, the program including instructions for determining the precoding matrix in accordance with the first channel information and the second channel information, wherein the transmitter is further configured to send data to the first device in accordance with the precoding matrix;
wherein the first channel information comprises K groups of first channel sub-information, wherein K is a positive integer and is equal to a quantity of column vectors comprised in the precoding matrix;
wherein each column vector corresponds to one group of first channel sub-information;
wherein the first channel sub-information comprises:
basic first channel sub-information, wherein the basic first channel sub-information is phase information of a reference element in a column vector corresponding to the first channel sub-information, and a phase of the reference element is non-zero; and
L−2 pieces of relative first channel sub-information, wherein L is a length of the column vector, each of the L−2 pieces of relative first channel sub-information corresponds to an element in the column vector whose phase is non-zero other than the reference element, and each of the L−2 pieces of relative first channel sub-information indicates a deviation between a phase of the element corresponding to a respective piece of the first channel sub-information and the phase of the reference element; and wherein the basic first channel sub-information is unquantized, and the L−2 pieces of relative first channel sub-information is quantized.

6. The second device according to claim 5, wherein the receiver is further configured to:
receive the first channel information as unquantized; and
receive the second channel information as quantized.

7. The second device according to claim 5, wherein the receiver is further configured to:
receive the first channel information as quantized and
receive the second channel information as quantized, wherein a quantity of quantization bits of the first channel information is greater than a quantity of quantization bits of the second channel information.

8. A method, comprising:
receiving, by a first device, a reference signal from a second device;
obtaining, by the first device, a precoding matrix in accordance with the reference signal;
generating, by the first device, first channel information and second channel information corresponding to the precoding matrix; and
sending, by the first device, the first channel information and the second channel information to the second device, wherein:
the first channel information corresponds to a first frequency band, the second channel information corresponds to a second frequency band, and the second frequency band is wider than the first frequency band such that the first channel information is more precise than the second channel information;
the first channel information comprises phase information of each element in the precoding matrix;
the second channel information comprises amplitude information of each element in the precoding matrix;
the first channel information comprises K groups of first channel sub-information, wherein K is a positive integer and is equal to a quantity of column vectors comprised in the precoding matrix;
each column vector corresponds to one group of first channel sub-information;
the first channel sub-information comprises:
basic first channel sub-information, wherein the basic first channel sub-information is phase information of a reference element in a column vector corresponding to the first channel sub-information, and a phase of the reference element is non-zero; and
L−2 pieces of relative first channel sub-information, wherein L is a length of the column vector, each of the L−2 pieces of relative first channel sub-information corresponds to an element in the column vector whose phase is non-zero other than the reference element, and each of the L−2 pieces of relative first channel sub-information indicates a deviation between a phase of the element corresponding to a respective piece of the first channel sub-information and the phase of the reference element; and
the basic first channel sub-information is unquantized, and the L−2 pieces of relative first channel sub-information is quantized.

9. The method according to claim 8, wherein:
the first channel information is unquantized; and
the second channel information is quantized.

10. The method according to claim 8, wherein:
both the first channel information and the second channel information are quantized; and
a quantity of quantization bits of the first channel information is greater than a quantity of quantization bits of the second channel information.

11. A method, comprising:
sending, by a second device, a reference signal to a first device;
receiving, by the second device, first channel information and second channel information from the first device, wherein the first channel information and the second channel information indicate a precoding matrix, and the precoding matrix is obtained by the first device in accordance with the reference signal, wherein the first channel information corresponds to a first frequency band, the second channel information corresponds to a second frequency band, the second frequency band is wider than the first frequency band such that the first channel information is more precise than the second channel information, the first channel information comprises phase information of each element in the precoding matrix, and the second channel information comprises amplitude information of each element in the precoding matrix;
determining, by the second device, the precoding matrix in accordance with the first channel information and the second channel information; and
sending, by the second device, data to the first device in accordance with the precoding matrix;
wherein the first channel information comprises K groups of first channel sub-information;
wherein K is a positive integer and is equal to a quantity of column vectors comprised in the precoding matrix;
wherein each column vector corresponds to one group of first channel sub-information;
wherein the first channel sub-information comprises:
basic first channel sub-information, wherein the basic first channel sub-information is phase information of a reference element in a column vector corresponding to the first channel sub-information, and a phase of the reference element is non-zero; and L−2 pieces of relative first channel sub-information, wherein L is a length of the column vector, each of the L−2 pieces of relative first channel sub-information corresponds to an element in the column vector whose phase is non-zero other than the reference element, and each of the L−2 pieces of relative first channel sub-information indicates a deviation between a phase of the element corresponding to a respective piece of the first channel sub-information and the phase of the reference element; and
wherein the basic first channel sub-information is unquantized, and the L−2 pieces of relative first channel sub-information is quantized.

12. The method according to claim 11, wherein the first channel information is unquantized, and the second channel information is quantized.

13. The method according to claim 11, wherein both the first channel information and the second channel information are quantized, and a quantity of quantization bits of the first channel information is greater than a quantity of quantization bits of the second channel information.

* * * * *